(12) United States Patent
Lombard et al.

(10) Patent No.: US 9,284,842 B2
(45) Date of Patent: Mar. 15, 2016

(54) AXISYMMETRIC PART FOR AN AVIATION TURBINE ENGINE ROTOR

(71) Applicants: SAFRAN, Paris (FR); SNECMA, Paris (FR)

(72) Inventors: Jean-Pierre Francois Lombard, Pamfou (FR); Wouter Balk, Melun (FR); Sebastien Pautard, Palaiseau (FR); Benjamin Samson, Paris (FR); Benjamin Kiener-Calvet, Moissy-Cramayel Cedex (FR); Frederic Rogues, Moissy-Cramayel Cedex (FR)

(73) Assignees: SAFRAN, Paris (FR); SNECMA, Paris (FR)

( * ) Notice: Subject to any disclaimer, the term of this patent is extended or adjusted under 35 U.S.C. 154(b) by 502 days.

(21) Appl. No.: 13/761,744

(22) Filed: Feb. 7, 2013

(65) Prior Publication Data
US 2013/0202449 A1   Aug. 8, 2013

(30) Foreign Application Priority Data
Feb. 8, 2012 (FR) ..................... 12 51174

(51) Int. Cl.
| | |
|---|---|
| *F01D 5/02* | (2006.01) |
| *F02K 3/06* | (2006.01) |
| *F01D 5/30* | (2006.01) |
| *F04D 29/32* | (2006.01) |
| *B64C 11/14* | (2006.01) |
| *F04D 29/64* | (2006.01) |
| *F01D 5/32* | (2006.01) |

(52) U.S. Cl.
CPC ... *F01D 5/02* (2013.01); *F02K 3/06* (2013.01); *F04D 29/321* (2013.01);
(Continued)

(58) Field of Classification Search
CPC ........... F02C 7/04; F01D 5/02; F01D 5/3007; F01D 5/3015; F01D 5/323; F01D 5/326; F01D 5/066; F04D 29/325; F04D 29/326; F04D 29/329; F04D 29/321; F04D 29/322; F04D 29/644; F04D 29/646; F02K 3/06; B64C 11/14; F05D 2300/603; F05D 2260/30
USPC ............ 415/218.1, 219.1; 416/219 R, 220 R, 416/221, 244 A, 245 R, 245 A
See application file for complete search history.

(56) References Cited

U.S. PATENT DOCUMENTS

| | | | |
|---|---|---|---|
| 5,281,096 A | 1/1994 | Harris et al. | |
| 5,833,435 A | 11/1998 | Smith | |

(Continued)

FOREIGN PATENT DOCUMENTS

| | | | | |
|---|---|---|---|---|
| CA | 2718270 A1 | * | 4/2011 | .............. B29C 70/74 |
| EP | 0 850 831 A2 | | 7/1998 | |

(Continued)

OTHER PUBLICATIONS

French Preliminary Search Report issued Oct. 15, 2012, in French 1251174, filed Feb. 8, 2012 (with English Translation of Categories of Cited Documents).

*Primary Examiner* — Christopher Verdier
(74) *Attorney, Agent, or Firm* — Oblon, McClelland, Maier & Neustadt, L.L.P.

(57) ABSTRACT

A link part for a turbine engine which mounted between a fan cone and a fan disk supporting fan blades is provided. The link part includes an annular wall pierced by a plurality of orifices, each orifice for receiving a fastener member and terminated by a substantially perpendicular rim having an outer surface that provides an aerodynamic extension of the fan between an outer surface of the fan cone and an outer surface of a fan blade platform. The annular wall is made of a first material that is composite and is provided on an inner surface of the rim with a ring made of a second material that is different from the first and that is suitable for radially retaining the fan blade platform.

10 Claims, 2 Drawing Sheets

(52) U.S. Cl.
CPC ........... *F04D 29/329* (2013.01); *F04D 29/644* (2013.01); *B64C 11/14* (2013.01); *F01D 5/3007* (2013.01); *F01D 5/3015* (2013.01); *F01D 5/326* (2013.01); *F04D 29/325* (2013.01); *F04D 29/326* (2013.01); *F04D 29/646* (2013.01); *F05D 2260/30* (2013.01); *F05D 2300/603* (2013.01)

(56) References Cited

U.S. PATENT DOCUMENTS

| | | |
|---|---|---|
| 2002/0102160 A1 | 8/2002 | Breakwell |
| 2009/0269202 A1 | 10/2009 | Borzakian et al. |
| 2009/0304438 A1* | 12/2009 | Kolax et al. ............... 403/24 |
| 2010/0258199 A1* | 10/2010 | Schreiber .................. 137/15.1 |
| 2011/0103726 A1 | 5/2011 | Xie et al. |
| 2014/0186166 A1* | 7/2014 | Kostka ..................... 415/182.1 |
| 2014/0255203 A1* | 9/2014 | Roby et al. ............... 416/245 R |
| 2014/0356134 A1* | 12/2014 | Stoughton et al. ........... 415/119 |

FOREIGN PATENT DOCUMENTS

| | | |
|---|---|---|
| EP | 1 227 036 A2 | 7/2002 |
| FR | 2 930 595 A1 | 10/2009 |

* cited by examiner

AXISYMMETRIC PART FOR AN AVIATION TURBINE ENGINE ROTOR

BACKGROUND OF THE INVENTION

The present invention relates to the general field of aviation turbine engines, and in particular turbojets. It relates more particularly to a link part having a radial retention function, such as a fan ferrule providing mechanical and aerodynamic connection between a fan inlet cone, fan blade platforms constituting the inside of the flow section between the fan blades, and a fan disk.

At its upstream end, a turbojet has an air inlet feeding a fan and a compressor having blades that are carried by disks secured to a rotor shaft that extends over a major portion of the turbojet and that is driven in rotation by a turbine of the turbojet.

An inlet cone is mounted on the upstream end of this platform in order to deflect a fraction of the air stream that penetrates into the turbojet towards the fan blades, this stream subsequently being separated into a primary stream that feeds the gas generator and a secondary stream that provides the majority of the thrust from the engine.

In the prior art, the inlet cone is securely mounted at the end of the platform and its shape and dimensions are determined so as to optimize the incidence of air on the roots of the fan blades for a given stage of flight, the inlet cone also needing to deflect particles or solid matter outwards and to constitute protection against ingesting ice.

The connection with the fan platform is subjected both to mechanical strength constraints and to aerodynamic performance constraints. The present metal-based technologies penalize the weight of the low pressure rotor line, while incorporating an aerodynamic contouring (3D flow section) function also penalizes the cost of fabrication. Furthermore, existing composite connections do not incorporate the function of radially retaining adjacent parts. It should be observed that this radial retention function applies mainly in conditions of accidental operation after ingesting a foreign body or losing a fan blade (the effect of dynamic reactions of the blade connected thereto during the transient phenomenon).

Selecting a structure that is appropriate for this link part thus depends on a compromise between those two relatively contradictory constraints, and prior art structures do not provide a genuinely satisfactory solution to those two constraints.

OBJECT AND SUMMARY OF THE INVENTION

An object of the present invention is thus to propose a link part in a turbine engine that satisfies the desired mechanical strength and aerodynamic performance constraints. The invention also seeks to provide a solution to this problem that is simple, inexpensive, and effective.

The invention thus provides a link part for a turbine engine, in particular such as a turbojet, the link part being mounted between a fan cone and a fan disk supporting fan blades, said link part having an annular wall pierced by a plurality of orifices, each for receiving a fastener member and terminated by a substantially perpendicular rim having an outer surface that provides an aerodynamic extension of said fan between an outer surface of said fan cone and an outer surface of a fan blade platform, wherein said annular wall is made of a first material that is composite and is provided on an inner surface of said rim with a ring made of a second material that is different from the first and that is suitable for radially retaining said fan blade platform.

It is thus possible to guarantee the radial retention function of the platform while also achieving a maximum weight saving as a result of using a composite material for the most part.

Advantageously, said second material may be either titanium, or a metal alloy based on titanium or aluminum, or else a long-fiber composite material, e.g. of the type involving winding a yarn, a tape, or a woven or stitched preform of carbon, glass, or aramid fibers.

Preferably, said orifices are provided with metal inserts, e.g. made of titanium or of metal alloy based on titanium and said outer surface that provides the aerodynamic extension of said fan may be covered in a fabric of composite material.

The invention also provides a turbine engine fan including a link part of the above-described type, and a turbine engine, such as a turbojet, incorporating such a fan.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF THE INVENTION

Figure 1:
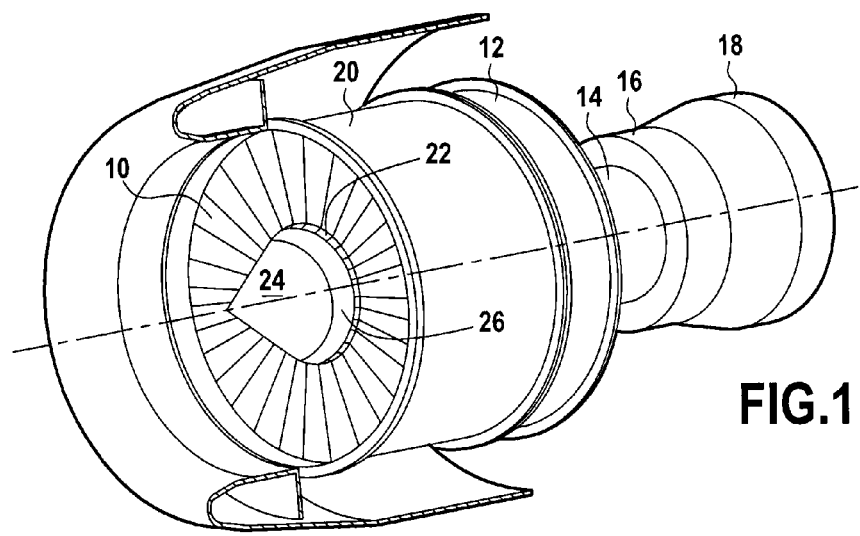
FIG. 1 is a diagrammatic outside view of a turbine engine.

The turbojet shown diagrammatically in FIG. 1 comprises, from upstream to downstream in the flow direction of the gas stream: a fan 10 located at the inlet of the turbojet, a compressor 12, a combustion chamber 14, a high pressure (HP) turbine 16, and a low pressure (LP) turbine 18. The HP and LP turbines are coupled respectively to the compressor 12 and to the fan 10 by coaxial HP and LP shafts (not shown).

The turbojet is housed in a casing made up of a plurality of portions, each corresponding to one of those various components, and in particular the fan 10 is surrounded by a fan casing 20 that is substantially cylindrical and that serves to channel a flow of air entering into the turbojet.

At its upstream end, the LP shaft carries a plurality of fan blades having their radially inner ends fastened in conventional manner to a fan disk (referenced 21 in FIG. 2), in contact with inter-blade platforms 22, and an inlet cone 24 is connected to these platforms carrying the fan blades via a link part 26 in order to deflect the central portion of the incoming gas stream towards these blades.

Figure 2:
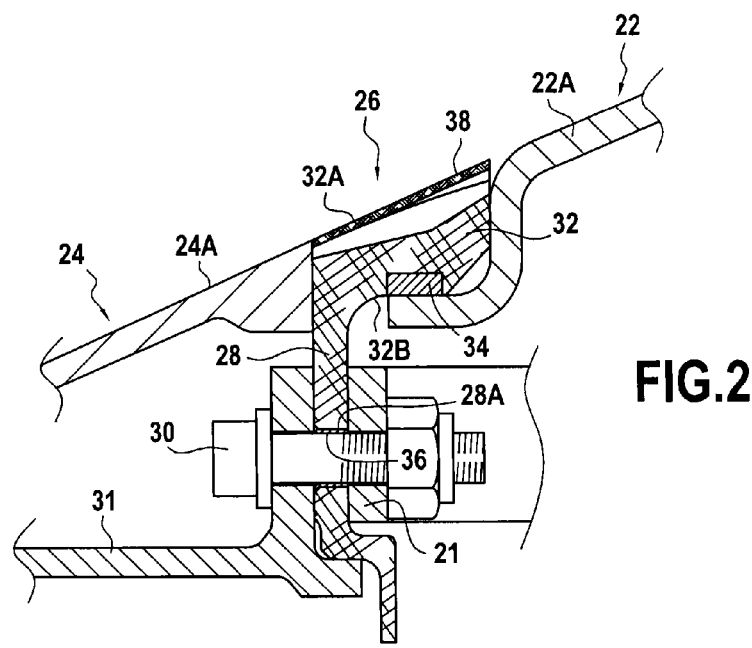
FIG. 2 is a longitudinal section through a link part of the invention shown in its environment.
Figure 3A:
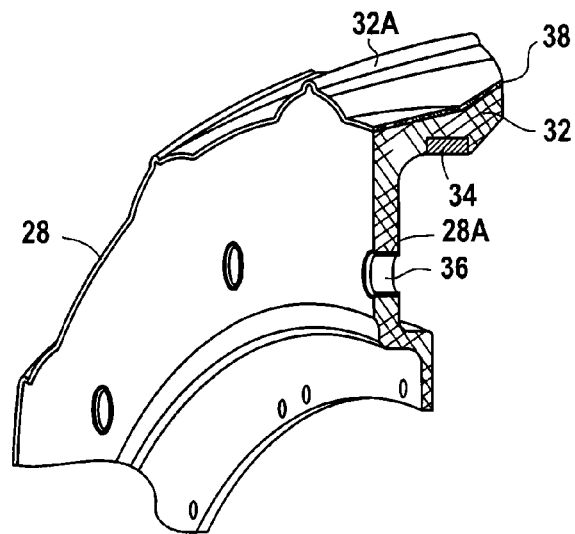
FIGS. 3A and 3B are respectively a perspective view and a radial section view of the FIG. 2 link part.
Figure 3B:
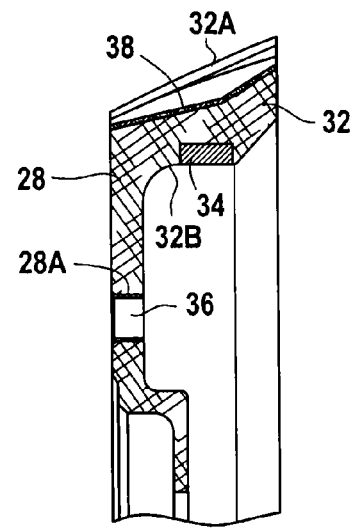

FIG. 2 shows this link part, or ferrule 26, in greater detail that is mounted between the inlet cone 24 and the fan disk 21, the inter-blade platforms 22 of the fan providing aerodynamic continuity with the inlet cone, and with detailed views thereof being given in FIGS. 3A and 3B.

In the invention, the link part is formed by an annular wall 28 pierced by a plurality of orifices 28A, each for receiving a respective fastener member 30 (e.g. of the nut and bolt type) for connecting the inlet cone, or an intermediate part 31 that is secured thereto, to the fan disk 21, and terminated by a substantially perpendicular rim 32 having an outer surface 32A that aerodynamically extends the fan between an outer surface 24A of the fan cone and an outer surface 22A of said fan blade platform, the annular wall being made of a first composite material and being provided on an inner surface 32B of the rim with a ring 34 made of a second material that is different from the first and that is suitable for radially retaining the fan blade platform 22.

This link part is thus a hybrid body of revolution comprising a body 28, 32 made of a first material and reinforced by a ring 34 made of a second material, together enabling all of the functions to be provided while presenting weight that is optimized compared with the prior art.

The first material is advantageously a thermosetting composite, e.g. a "HexMC®" as available from the US supplier Hexcel, or a thermoplastic composite such as "Xycomp®" available from the US supplier Greene Tweed. Those two composites make it possible to obtain complex shapes that satisfy the aerodynamic performance requirement (3D flow section contouring). However it is also possible to use short-fiber sheet-molding compound (SMC) and bulk-molding compound (BMC).

The second material may be a metal, e.g. titanium or a metal alloy based on titanium (or aluminum), or else a composite having long fibers (greater than 10 millimeters (mm)), e.g. of the type involving winding a yarn, a tape, or a woven or stitched preform of carbon, glass, Kevlar®, or aramid fibers. The second material provides the platform with radial strength while distributing the associated local loads tangentially.

Metal or long-fiber composite inserts 36 may be added to provide strength for the mechanical fastenings 30 with the front cone 24.

A dry or pre-impregnated fabric or composite material 38 made up of a matrix of epoxy resin or of a thermoplastic and of (unidirectional or (in a sheet) or bidirectional) reinforcing fibers of carbon, glass, Kevlar®, or aramid may also be used on the outer surface 32A of the link part for functions of withstanding lightning or erosion. Conventionally, this composite fabric is put into the mold for the link part prior to a consolidation step (e.g. by polymerization). The link part is obtained by a molding transformation method using the following steps:

The mold is advantageously previously made of a plurality of movable portions, so an initial step consists in putting the retention ring made of the second material into place while positioning any inserts in the appropriate portions of the mold. The first composite material (which is usually in the form of a roll of raw material that can be folded or cut or in the form of a "hash" of fibers) can then be inserted into the mold as prepared in this way. The mold is then closed and its temperature and pressure may be raised in order to consolidate the matrix of the first material. Once that has been done, the mold may be opened and brought to ambient in order finally to enable the link part to be unmolded. It should be observed that the different nature of the metal or composite second material enables it to remain unaffected by the step of consolidating the first material.

What is claimed is:

1. A link part for a turbine engine, the link part being mounted between a fan cone and a fan disk supporting fan blades, said link part comprising:
   an annular wall pierced by a plurality of orifices, each orifice for receiving a fastener member and terminated by a substantially perpendicular rim having an outer surface providing an aerodynamic extension between an outer surface of said fan cone and an outer surface of a fan blade platform,
   wherein said annular wall is made of a first material that is a composite material and is provided on an inner surface of said rim with a ring made of a second material which is a metal material including titanium or a metal alloy based on titanium and aluminum and is suitable for radially retaining said fan blade platform.

2. A link part according to claim 1, wherein said orifices are provided with metal inserts made of titanium or of metal alloy based on titanium.

3. A link part according to claim 1, wherein said outer surface providing the aerodynamic extension is covered in a fabric of composite material for withstanding lightning or erosion.

4. A fan including at least one link part according to claim 1.

5. A turbine engine including the fan according to claim 4.

6. A link part for a turbine engine, the link part being mounted between a fan cone and a fan disk supporting fan blades, said link part comprising:
   an annular wall pierced by a plurality of orifices, each orifice for receiving a fastener member and terminated by a substantially perpendicular rim having an outer surface providing an aerodynamic extension between an outer surface of said fan cone and an outer surface of a fan blade platform,
   wherein said annular wall is made of a short-fiber composite material and is provided on an inner surface of said rim with a ring made of a long-fiber composite material that is different from the short-fiber composite material and is suitable for radially retaining said fan blade platform,
   wherein said outer surface providing the aerodynamic extension is covered in a fabric of composite material for withstanding lightning or erosion, and
   wherein the ring abuts the fan blade platform.

7. A link part according to claim 6, wherein said orifices are provided with metal inserts made of titanium or of metal alloy based on titanium.

8. A fan including at least one link part according to claim 6.

9. A turbine engine including a fan according to claim 8.

10. A link part according to claim 6, wherein said long-fiber composite material is of a type involving winding a yarn, a tape, or a woven or stitched preform of carbon, glass, or aramid fibers.

* * * * *